(12) United States Patent
Jiang et al.

(10) Patent No.: US 9,362,707 B2
(45) Date of Patent: Jun. 7, 2016

(54) SUPERCONTINUUM SYSTEM WITH MICROSTRUCTURED PHOTONIC CRYSTAL FIBERS BASED ON FLUORIDE GLASS

(71) Applicant: Max-Planck-Gesellschaft zur Förderung der Wissenschaften e.V., München (DE)

(72) Inventors: Xin Jiang, Erlangen (DE); Fehim Babic, Erlangen (DE); Nicolas Y. Joly, Erlangen (DE); Philip St. J. Russell, Erlangen (DE)

(73) Assignee: Max-Planck-Gesellschaft Zur Foderung der Wissenschaften EV., Munich (DE)

( * ) Notice: Subject to any disclaimer, the term of this patent is extended or adjusted under 35 U.S.C. 154(b) by 0 days.

(21) Appl. No.: 14/526,994

(22) Filed: Oct. 29, 2014

(65) Prior Publication Data

US 2015/0117474 A1 Apr. 30, 2015

Related U.S. Application Data

(60) Provisional application No. 61/897,624, filed on Oct. 30, 2013.

(51) Int. Cl.
*H01S 3/067* (2006.01)
*H01S 3/17* (2006.01)

(52) U.S. Cl.
CPC ............. *H01S 3/06716* (2013.01); *H01S 3/067* (2013.01); *H01S 3/06741* (2013.01); *H01S 3/06795* (2013.01); *H01S 3/173* (2013.01)

(58) Field of Classification Search
CPC . H01S 3/06716; H01S 3/067; H01S 3/06741; H01S 3/06795; H01S 3/173
See application file for complete search history.

(56) References Cited

U.S. PATENT DOCUMENTS

| 2007/0160091 A1 | 7/2007 | Lee et al. |
| 2012/0027031 A1 | 2/2012 | Liu |
| 2013/0058366 A1* | 3/2013 | Leproux et al. ................. 372/25 |

FOREIGN PATENT DOCUMENTS

WO 2013078215 A1 5/2013

OTHER PUBLICATIONS

International Search Report and Written Opinion mailed Feb. 19, 2015 in corresponding International Application No. PCT/US2014/062824.

* cited by examiner

*Primary Examiner* — Xinning Niu
(74) *Attorney, Agent, or Firm* — Graham Curtin, P.A.

(57) ABSTRACT

A fiber-based supercontinuum system including: a pump laser; a ZBLAN or other fluoride-based microstructured glass fiber; and control electronics; wherein the control electronics control the pump laser to generate laser pulses into the ZBLAN or other fluoride-based microstructured glass fiber. The fabrication of a ZBLAN photonic crystal fiber with sub-micron features and large air-filling fraction and the use of the fiber to generate a stable supercontinuum (200 to 2500 nm) from 140 fs, 1 nJ pulses at 1042 nm are disclosed.

13 Claims, 5 Drawing Sheets

SUPERCONTINUUM SYSTEM WITH MICROSTRUCTURED PHOTONIC CRYSTAL FIBERS BASED ON FLUORIDE GLASS

CROSS REFERENCES TO RELATED APPLICATIONS

This application claims the benefit of U.S. Provisional Patent Application No. 61/897,624 filed on Oct. 30, 2013. The disclosure of U.S. Provisional Patent Application 61/897,624 is hereby incorporated by reference.

FIELD OF THE INVENTION

The present invention relates to the field of supercontinuum systems, and more particularly to supercontinuum systems with microstructured photonic crystal fibers based on fluoride glass.

BACKGROUND

The group velocity dispersion (GVD) of a solid core silica-air photonic crystal fiber (PCF) can be adjusted over a wide spectral range by varying the core size and the air-filling fraction [1]. In particular, PCF can be designed to have a zero dispersion point that lies close to the wavelength of many common lasers, permitting the generation of bright supercontinuum (SC) light. Many different lasers, from fs pulsed to CW, have been successfully and efficiently broadened in this way [2]. PCFs have thus revolutionized white light sources and frequency metrology over the past decade, and are now routinely in use in laboratories and commercial products. A limitation of current PCT-based SC sources is, however, that fused silica suffers from strong material absorption in the mid-IR beyond 2 μm, and solarisation induced by UV light (starts from wavelength<380 nm), which restricts the generated SC within these two limits. Other materials such as heavy-metal oxide, chalcogenide or fluoride-based glasses, are promising replacements for silica, offering extended windows of transmission (from ~200 nm to above 7 μm for ZBLAN, for example). Among these glasses, fluoride-based glass family (e.g., ZBLAN ($ZrF_4$—$BaF_2$—$LaF_3$—$AlF_3$—NaF), $InF_3$, $BeF_2$, etc.) is transparent from the UV to the mid-IR, and if carefully synthesized has extremely low water absorption. This makes it ideal for the generation of multi-octave-wide supercontinua.

SUMMARY

One embodiment of the present invention provides a fiber-based supercontinuum system including: a pump laser; a ZBLAN or other fluoride-based microstructured glass fiber; and control electronics; wherein the control electronics control the pump laser to generate laser pulses into the ZBLAN or other fluoride-based microstructured glass fiber.

Another embodiment of the present invention provides a ZBLAN or other fluoride-based microstructured glass fiber having a glass-air microstructure with a core diameter and an air-filling fraction designed for optimum supercontinuum generation when pumped by near-IR or IR lasers.

Another embodiment of the present invention provides a ZBLAN or other fluoride-based microstructured glass fiber having a rare-earth-doped or rare-earth-co-doped core suitable for high performance lasers and amplifiers from the UV to the infrared.

Another embodiment of the present invention provides an intracavity supercontinuum fiber laser source comprising a ZBLAN or other fluoride-based microstructured glass fiber having a glass-air microstructure with a rare-earth-doped or rare-earth-co-doped core suitable for high performance lasers and amplifiers from the UV to the infrared, and with a core diameter and an air-filling fraction designed for optimum supercontinuum generation when pumped by near-IR or IR lasers.

DETAILED DESCRIPTION OF THE PREFERRED EMBODIMENTS

Figure 1:
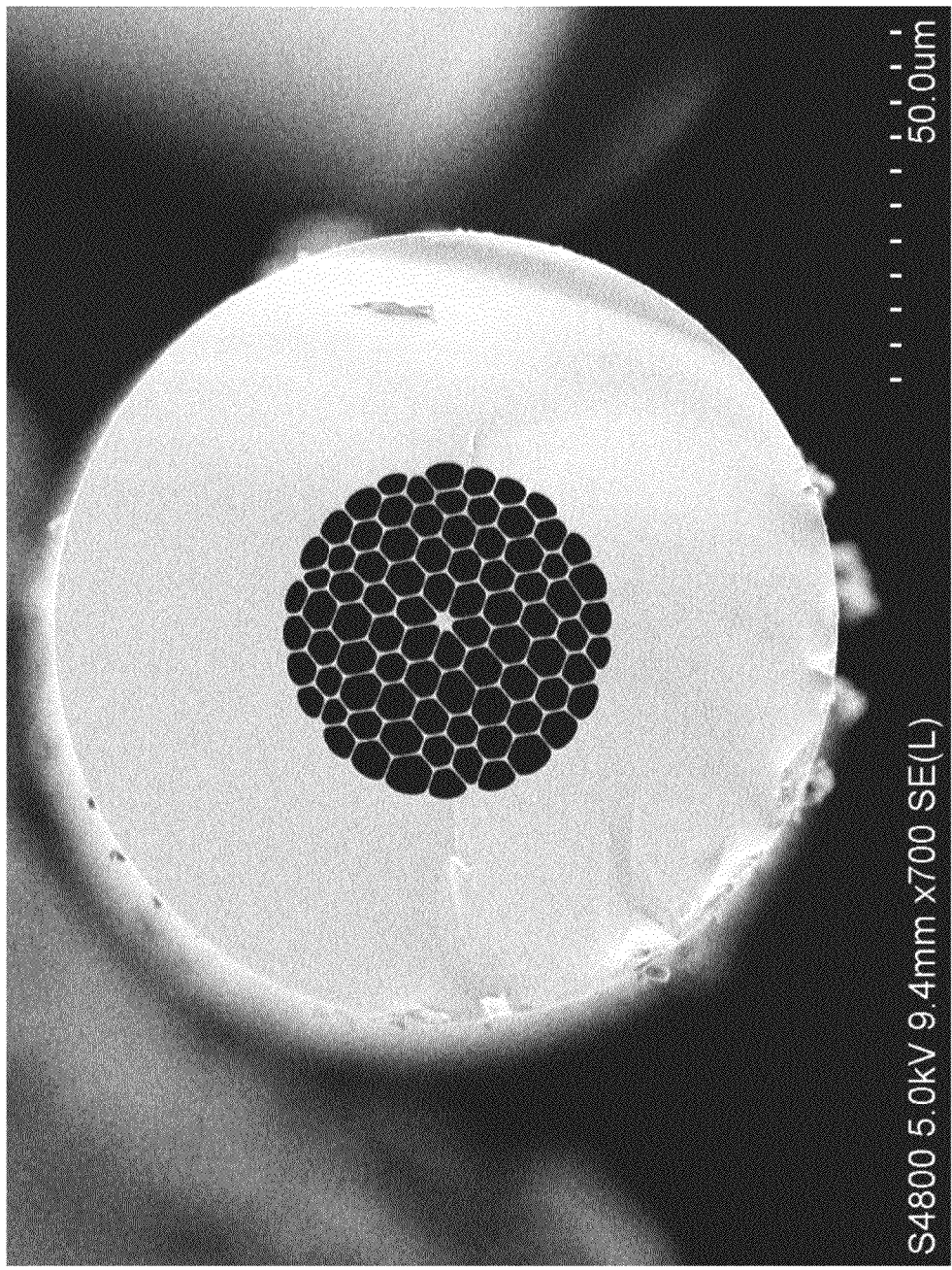
FIG. 1 is a highly nonlinear ZBLAN PCF.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Drawing complex microstructured fibers from ZBLAN glass is very difficult because of the narrow temperature range (<10° C., compared to ~300° C. for silica) over which its viscosity is suitable. Previous work on microstructured ZBLAN fibers by the Adelaide group made use of extrusion to produce a structure with a large (~100 µm) core surrounded by one ring of hollow channels [3]. To date SC has been generated in all-solid step-index ZBLAN fibers with core diameters of ~7 µm [4-6]. Although the results are promising, these fibers required pumping with pulses in the µJ [3] or even mJ range [4], due to their low effective nonlinearity and non-ideal dispersion landscape. The dispersion of bulk ZBLAN glass is plotted against wavelength in FIG. 3. It has a zero dispersion point at 1.62 µm (compared to ~1.3 µm for fused silica), which can be shifted to shorter wavelength by producing fibers with smaller cores. This was recently achieved with the use of tapering, resulting in the demonstration of IR spectra extending from 1 to 3.5 µm with a flatness of ~10 dB for pulse energies of ~100 nJ at 1550 nm [7].

Figure 2:
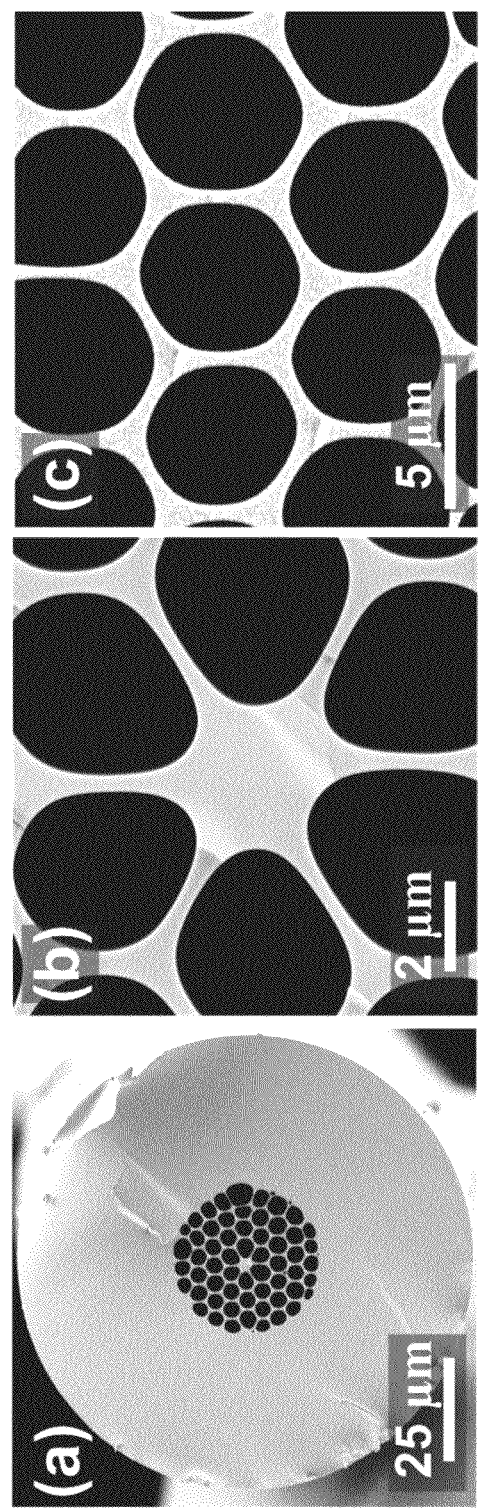
FIG. 2 is a ZBLAN PCF for generating three-octave-wide spectrum.

Disclosed here is the successful fabrication, using advanced stack-and-draw techniques, of small-core ZBLAN glass PCFs with large air-filling fraction (FIG. 1 and FIG. 2). The scanning electron micrograph (SEM) in FIG. 2b shows a slightly elliptical core with maximum and minimum diameters of 3.71 and 3.03 µm. It is surrounded by four rows of hollow cladding channels interspersed with triangular interstitial waveguides of diameter ~1 µm (FIG. 2c). As can be seen, these cladding waveguides are optically quite isolated from each other, permitting their use as independent guiding cores (at least at shorter wavelength, when the modal fields do not spread out too far).

Figure 3:
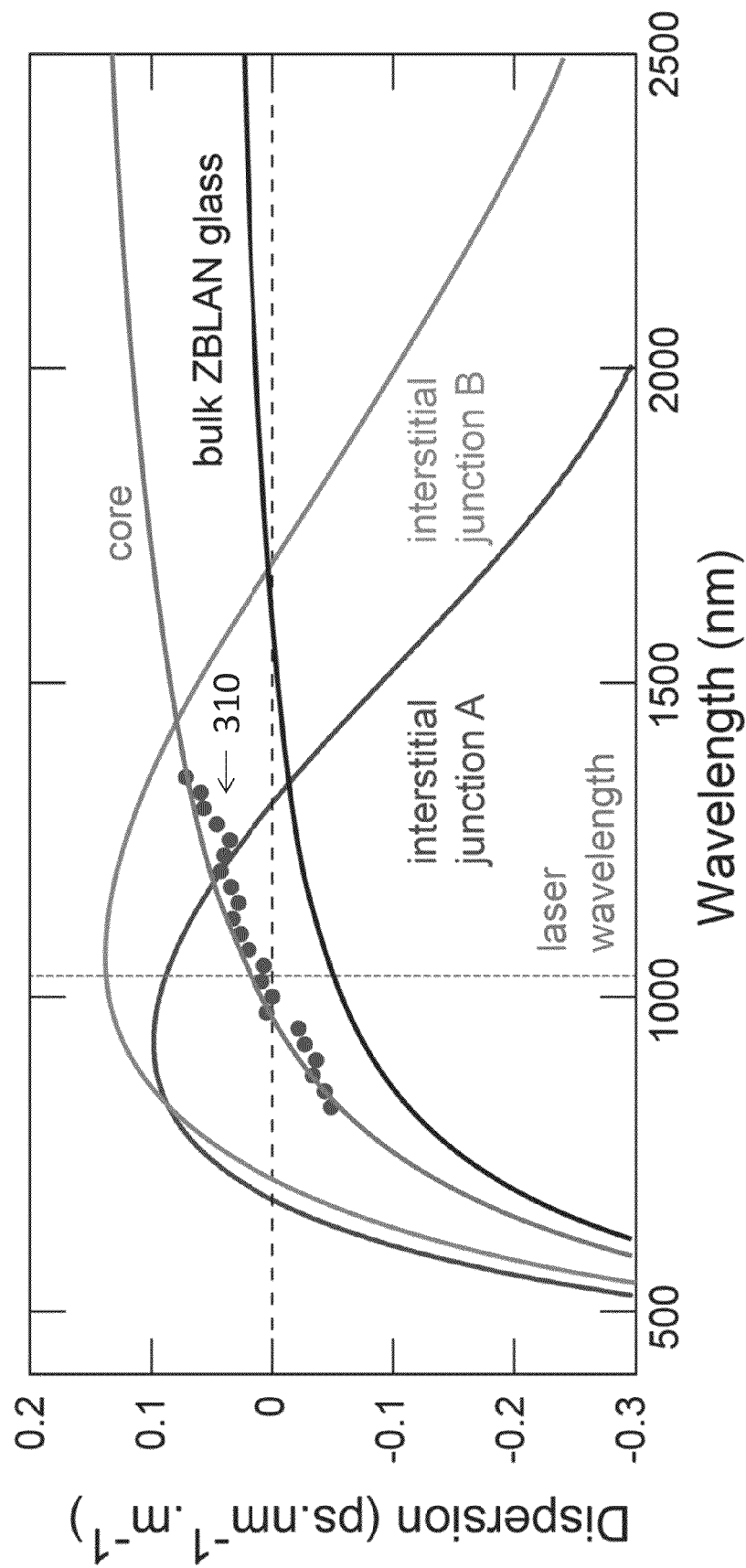
FIG. 3 is a Dispersion landscape of bulk ZBLAN glass, the birefringent core and two interstitial junctions in the cladding.
Figure 4:
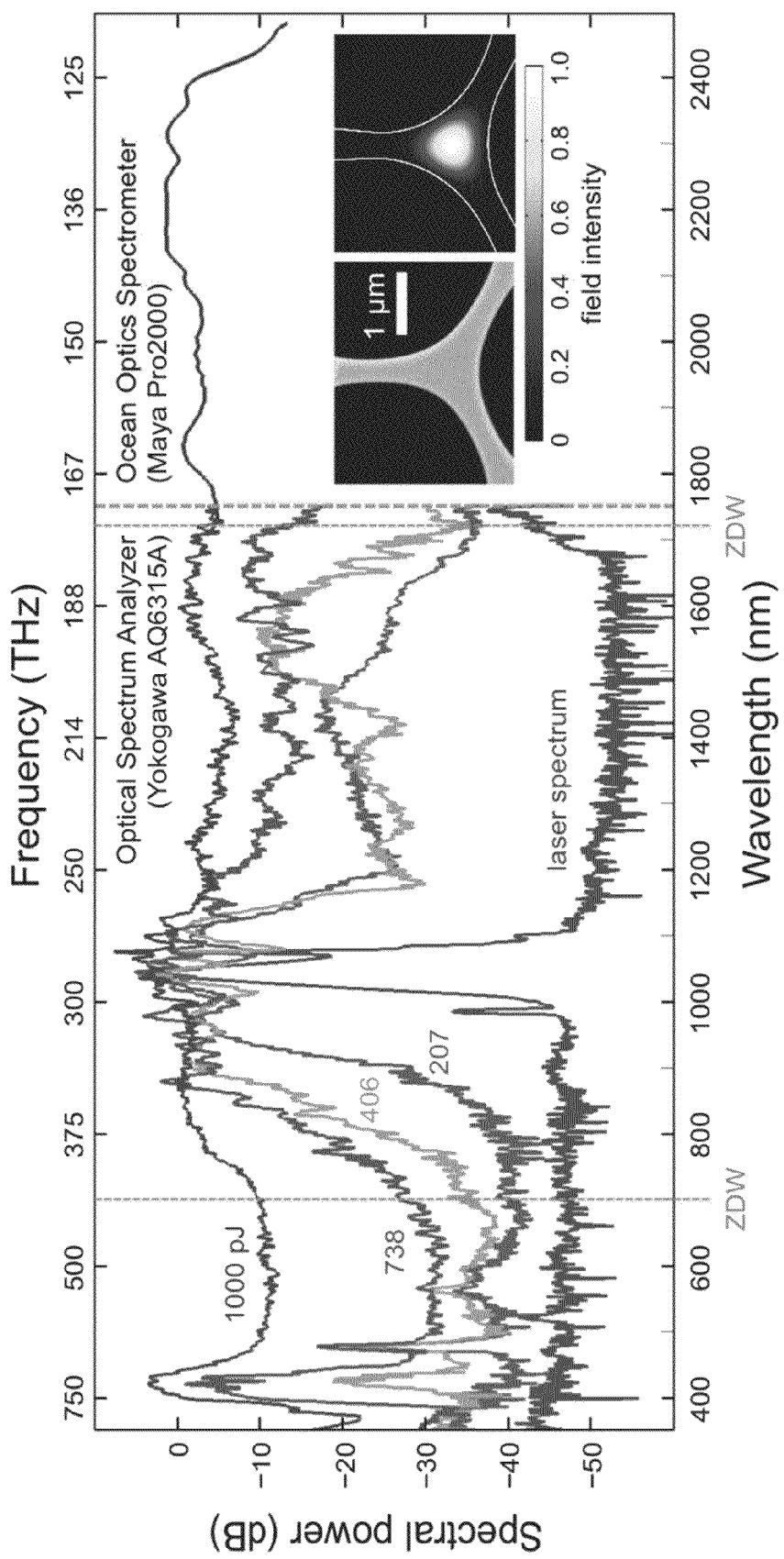
FIG. 4 is a Supercontinuum generation in ZBLAN PCF. Under 1 nJ the spectrum has broadened to close to three octaves ($2^3$ frequency ratio between its spectral edges) wide.

The circles 310 on FIG. 3 represent dispersion values for the core mode, measured for one of the polarization eigenstates using low coherence interferometry. The dispersion of bulk ZBLAN glass is also shown. Also plotted are numerically calculated dispersion curves for interstitial junctions A and B, embedded in ZBLAN glass and terminated by a perfectly matched layer. The calculations were based on high resolution SEMs and finite-element software from JCMwave. The interstitial mode is triangular and well confined to the glass strand at 1 µm wavelength (inset of FIG. 4), although it will spread out more at longer wavelength. Two zero dispersion wavelengths appear for junction A (670 and 1300 nm) and junction B (700 and 1720 nm). The point of maximum anomalous dispersion lies close to the 1042 nm pump wavelength (FIG. 3). Unlike the core mode, which has a ZDW at ~850 nm, the interstitial junctions offer a dispersion landscape that is ideal for SC generation. As a result, focus is placed on generating SC using them.

Figure 5:
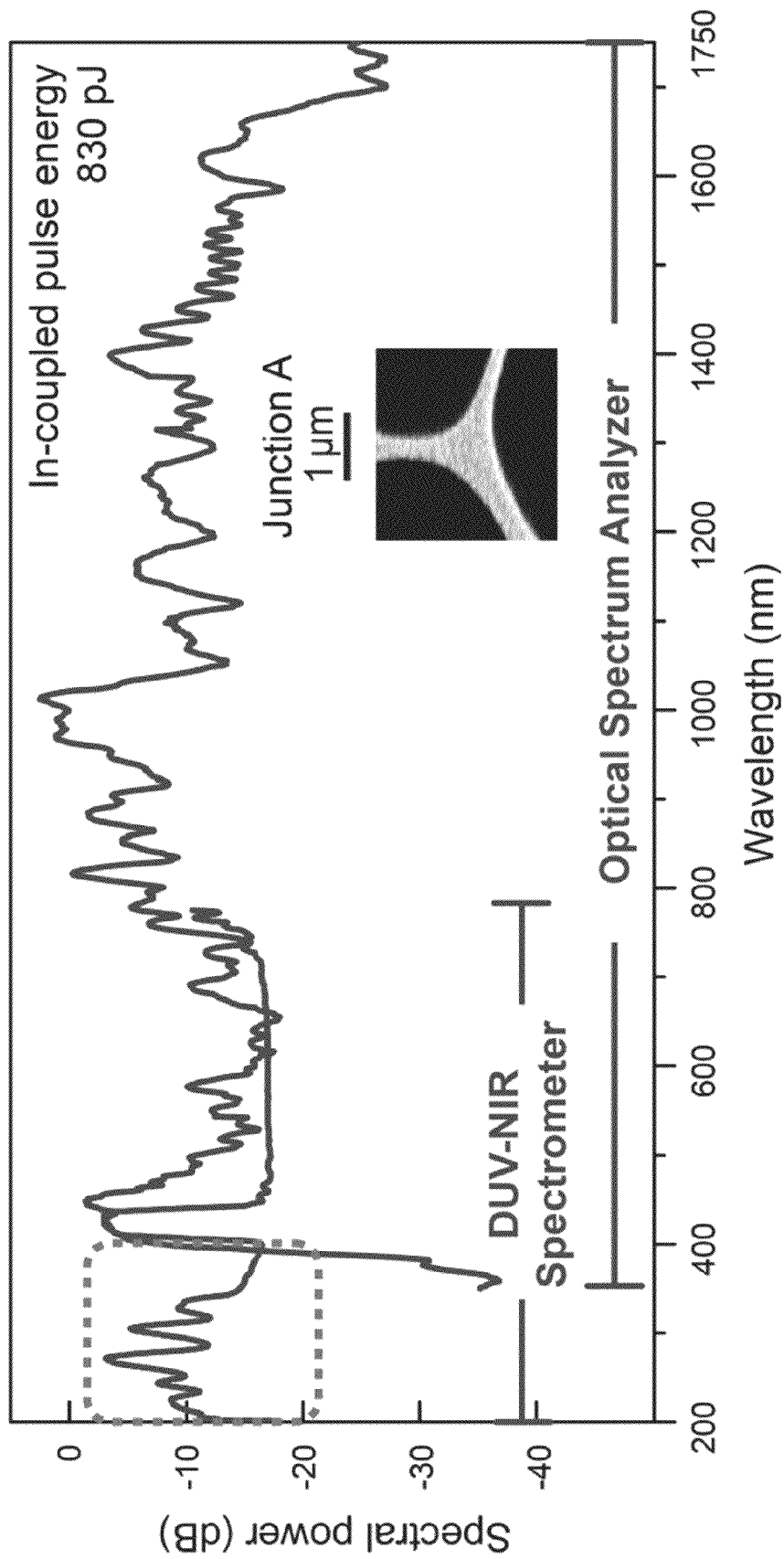
FIG. 5 is a Supercontinuum generation in ZBLAN PCF. Under 830 pJ the spectrum has broadened from 200 nm to 175 nm, spanning over three octaves.

By tightly focusing the laser light and scanning it across the cladding structure, so as to visit different interstitial junctions one-by-one, one embodiment of the invention can identify a junction where an almost three-octave-wide SC was generated in a fiber sample 4.3 cm long. In one embodiment, pumping junction B at the maximum available energy (11.8 nJ, corresponding to an in-fiber energy of ~1 nJ at the measured launch efficiency of ~8%) the spectrum extended from 350 nm to 2.5 µm with a flatness better than 10 dB, and from 800 nm to 2.4 µm with a flatness better than 3 dB. The average spectral energy density is ~0.5 pJ/nm over this range. In one embodiment, pumping junction A with 830 pJ of launched pulse energy resulted in generation of a greater than three-octave-wide SC, extending from 200 nm to 1750 nm, as shown in FIG. 5. Such extreme spectral broadening at such low pulse energy is the result of the suitable dispersion landscape and the small modal area (~1.42 µm$^2$ at 1 µm wavelength, estimated from FEM calculations), which results in an effective fiber nonlinearity of 0.25 m$^{-1}$ W$^{-1}$.

The UV light emission from Junction A showed no signs of optical damage even after running experiments for 5-6 hours every day over a period of a few months. This was further verified by performing lifetime experiments in which the output spectrum between 200 and 400 nm was recorded at 5 minute intervals over 24 hours. The results show that there is no sign of degradation.

Note that existing systems cannot produce supercontinuum in such deep UV region. For example, in a current supercontinuum system with a silica glass fiber, the silica glass fiber would be damaged due to solarisation even when 300 nm light is generated in it.

In one embodiment, preliminary simulations based on numerical solutions of the generalized nonlinear Schrodinger equation for the calculated dispersion landscape, confirm these results in broad outline. SC generation is governed by soliton dynamics, the initial spectral broadening (driven by self-phase modulation) being accompanied by dispersive wave emission at ~380 nm. At the same time, solitons emerge from the pump pulse and shift to longer wavelength as a result of the soliton self-frequency shift. As they approach the second ZDW at 1720 nm, dispersive waves are emitted in the normal dispersion regime at wavelengths beyond 1720 nm.

In one embodiment, good quality photonic crystal fibers with high air-filling fractions and sub-micron-scale features can be drawn from ZBLAN glass. The wide transmission window of the glass, together with the ability to strongly modify the dispersion landscape, represents a significant advance compared to previous work on all-solid step-index ZBLAN fibers, opening up remarkable possibilities for the generation of ultra-broadband supercontinua. A supercontinuum system includes: a pump laser; a ZBLAN fiber; and control electronics; wherein the control electronics control the pump laser to generate laser pulses into the ZBLAN fiber. It is expected that the disclosed technique is able to produce fibers with a smaller central core in the future. ZBLAN glass also is an excellent host for rare-earth ions, suggesting the possibility ultra-broad-band intra-cavity SC-generation in fiber lasers. An embodiment of the invention has demonstrated over three-octave-wide stable SC, spanning from deep UV to mid-IR, produced by 140 fs pulses of energy ~1 nJ, has many applications in fields such as spectroscopy and pollution monitoring.

REFERENCES

[1]. P. St.J. Russell, "Photonic-crystal fibers," J. Lightwave Technol. 24, 4729-4749 (2006).

[2]. J. M. Dudley, G. Genty, and S. Coen, "Supercontinuum generation in photonic crystal fiber," Rev. Mod. Phys. 78, 1135-1184 (2006).

[3]. H. Ebendorff-Heidepriem et al., "Fluoride glass microstructured optical fiber with large mode area and mid-infrared transmission," Opt. Lett. 33, 2861-2863 (2008).

[4]. G. Qin et al., "Ultrabroadband supercontinuum generation from ultraviolet to 6.28 µm in a fluoride fiber," App. Phys. Lett. 95, 161103 (2009).

[5]. C. Agger et al., "Supercontinuum generation in ZBLAN fibers—detailed comparison between measurement and simulation," J. Opt. Soc. Am. B 29, 635-645 (2012).

[6]. J. Swiderski, M. Michalska, and G. Maze, "Mid-IR supercontinuum generation in a ZBLAN fiber pumped by a gain-switched mode-locked Tm-doped fiber laser and amplifier system," Opt. Exp. 21, 7851-7857 (2013).

[7]. I. Kubat, C. S. Agger, P. M. Moselund, and O. Bang, "Mid-infrared supercontinuum generation to 4.5 µm in uniform and tapered ZBLAN step-index fibers by direct pumping at 1064 or 1550 nm," J. Opt. Soc. Am. B 30, 2743-2757 (2013).

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A fiber-based supercontinuum system comprising: a pump laser, a ZBLAN or other fluoride-based microstructured glass fiber, and control electronics;
    wherein the control electronics control the pump laser to generate laser pulses into the ZBLAN or other fluoride-based microstructured glass fiber,
    wherein the system generates UV light having a wavelength less than 300 nm, with stability exceeding one or more days without degradation to the fiber.

2. The fiber-based supercontinuum system as in claim 1, wherein the system generates an at-least-2-octave wide supercontinuum with spectral flatness better than 20 dB, wherein a ratio of highest to lowest frequency equal to at least 4.

3. The fiber-based supercontinuum system as in claim 2, with a spectral flatness better than 10 dB.

4. The fiber-based supercontinuum system as in claim 2, with a spectral flatness better than 5 dB.

5. The fiber-based supercontinuum system as in claim 2, at pump pulse energies of below 1 nJ.

6. The fiber-based supercontinuum system as in claim 1, at pump pulse energies of below 1 nJ.

7. The fiber-based supercontinuum system as in claim 2, wherein the ZBLAN or other fluoride-based microstructured glass fiber comprises a glass-air microstructure with a core diameter and an air-filling fraction designed for optimum supercontinuum generation when pumped by near-IR or IR lasers.

8. The fiber-based supercontinuum system as in claim 1, wherein the ZBLAN or other fluoride-based microstructured glass fiber comprises a glass-air microstructure with a core diameter and an air-filling fraction designed for optimum supercontinuum generation when pumped by near-IR or IR lasers.

9. The fiber-based supercontinuum system as in claim 7, wherein the system makes use of a pulsed fiber laser as pump source, with Yb:doped (1 µm), Er:doped (1.55 µm) or Tm:doped (2 µm) or any other dopant or combination of dopants.

10. The fiber-based supercontinuum system as in claim 8, wherein the system makes use of a pulsed fiber laser as pump source, with Yb:doped (1 µm), Er:doped (1.55 µm) or Tm:doped (2 µm) or any other dopant or combination of dopants.

11. A ZBLAN or other fluoride-based microstructured glass fiber having a glass-air microstructure with a core diameter and an air-filling fraction designed for optimum supercontinuum generation when pumped by near-IR or IR lasers,
    wherein the fiber supports generation of UV light having a wavelength less than 300 nm when pumped by a pump laser, with stability exceeding one or more days without degradation to the fiber.

12. A ZBLAN or other fluoride-based microstructured glass fiber having a rare-earth-doped or rare-earth-co-doped core suitable for high performance lasers and amplifiers from the UV to the infrared,
    wherein the fiber supports generation of UV light having a wavelength less than 300 nm when pumped by a pump laser, with stability exceeding one or more days without degradation to the fiber.

13. An intracavity supercontinuum fiber laser source comprising a ZBLAN or other fluoride-based microstructured glass fiber having a glass-air microstructure with a rare-earth-doped or rare-earth-co-doped core suitable for high performance lasers and amplifiers from the UV to the infrared, and with a core diameter and an air-filling fraction designed for optimum supercontinuum generation when pumped by near-IR or IR lasers,
    wherein the fiber supports generation of UV light having a wavelength less than 300 nm when pumped by a pump laser, with stability exceeding one or more days without degradation to the fiber.

* * * * *